US012068568B2

(12) United States Patent
Weber et al.

(10) Patent No.: US 12,068,568 B2
(45) Date of Patent: Aug. 20, 2024

(54) CABLE FEED DEVICE, CABLE PROCESSING SYSTEM, AND METHOD FOR FEEDING A CABLE TO A CABLE PROCESSING MACHINE

(71) Applicant: Komax Holding AG, Dierikon (CH)

(72) Inventors: Bruno Weber, Ballwil (CH); Ivan Addario, Hochdorf (CH)

(73) Assignee: KOMAX HOLDING AG, Dierikon (CH)

( * ) Notice: Subject to any disclaimer, the term of this patent is extended or adjusted under 35 U.S.C. 154(b) by 1072 days.

(21) Appl. No.: 16/919,193

(22) Filed: Jul. 2, 2020

(65) Prior Publication Data

US 2021/0021091 A1 Jan. 21, 2021

(30) Foreign Application Priority Data

Jul. 16, 2019 (EP) .................................... 19186436

(51) Int. Cl.

| | |
|---|---|
| ***B21F 23/00*** | (2006.01) |
| ***B65H 51/10*** | (2006.01) |
| ***B65H 51/20*** | (2006.01) |
| ***B65H 57/00*** | (2006.01) |
| ***B65H 59/34*** | (2006.01) |
| ***H01R 43/052*** | (2006.01) |
| ***H01R 43/28*** | (2006.01) |

(52) U.S. Cl.

CPC .......... *H01R 43/052* (2013.01); *B21F 23/00* (2013.01); *B65H 51/10* (2013.01); *B65H 51/20* (2013.01); *B65H 57/003* (2013.01); *B65H 59/34* (2013.01); *H01R 43/28* (2013.01)

(58) Field of Classification Search

CPC ...... B65H 51/10; B65H 51/20; B65H 57/003; B65H 59/34; B21F 23/00; H01R 43/052

See application file for complete search history.

(56) References Cited

U.S. PATENT DOCUMENTS 2,863,613 A * 12/1958 Bunch .................. B65H 67/056
242/474.9
4,854,510 A 8/1989 Romanin et al.
(Continued)

FOREIGN PATENT DOCUMENTS

| | | | |
|---|---|---|---|
| CN | 1297418 | A | 5/2001 |
| CN | 104370159 | A | 2/2015 |
| DE | 69611424 | T2 | 8/2001 |

(Continued)

*Primary Examiner* — William E Dondero

(74) *Attorney, Agent, or Firm* — William J. Clemens; Shumaker, Loop & Kendrick, LLP

(57) ABSTRACT

A cable feed device for feeding a cable to a cable processing machine includes a first rotatable roller and a second rotatable roller for guiding the cable such that the cable can be arranged in a loop around the first roller and the second roller, and a cable drive for transporting the cable. The first roller is arranged stationary, wherein the second roller can be pushed or pulled away from the first roller with a force, wherein the second roller has a first state and a second state, wherein the second roller is locked in a first position in the first state and is moved in the second state by the force such that the distance between the first roller and the second roller changes depending on the length of the cable between the two rollers.

14 Claims, 8 Drawing Sheets

(56) References Cited

U.S. PATENT DOCUMENTS

| | | | | |
|---|---|---|---|---|
| 7,398,903 | B2 | 7/2008 | Ulrich | |
| 2006/0081675 | A1* | 4/2006 | Enyedy | B23K 9/125<br>226/190 |

FOREIGN PATENT DOCUMENTS

| | | | |
|---|---|---|---|
| DE | 102007024588 | A1 | 1/2008 |
| DE | 102010047531 | A1 | 4/2012 |
| DE | 202013104456 | U1 | 12/2013 |
| EP | 0340770 | A1 | 11/1989 |
| EP | 1514823 | A1 | 3/2005 |
| EP | 1975106 | A2 | 10/2008 |
| EP | 3091643 | A1 | 9/2016 |
| FR | 1348064 | A | 1/1964 |
| GB | 123592 | A | 2/1919 |
| GB | 1467453 | A | 3/1977 |
| JP | S6067361 | A | 4/1985 |
| WO | 9748548 | A1 | 12/1997 |
| WO | 2018189119 | A1 | 10/2018 |
| WO | 2019054084 | A1 | 3/2019 |

* cited by examiner

CABLE FEED DEVICE, CABLE PROCESSING SYSTEM, AND METHOD FOR FEEDING A CABLE TO A CABLE PROCESSING MACHINE

FIELD

The invention relates to a cable feed device, a cable processing system, and a method for feeding a cable to a cable processing machine.

BACKGROUND

Cable feed devices are used to pull cables from a container or a cable source (e.g. drum, packet, or barrel) and feed them to a cable processing machine. This is necessary if the cable has to be pulled evenly from the container to prevent the cable from getting caught in itself. The cable processing machines have to stop the cable again and again for the processing steps and then accelerate it again to a relatively high transport speed in order to achieve large production outputs. The cable feed device therefore has the task of an intermediate storage or buffer, which balances the dynamic functioning of the cable processing machine towards the container.

There are simple cable feed devices that are designed to constantly fill their storage. These cable feed devices are inexpensively constructed with a spring-loaded arm. For an operator, threading the cable into such a feed system is complex. The deflection arm is in its maximum position at the beginning. The operator has to fill the entire storage by hand. He threads in a plurality of meters of the cable and always keeps the cable under tension. This is very complex and threading takes a long time.

In addition to the simple cable feed devices, there are also complex cable feed devices, which are mostly integrated into the cable processing machines. The intermediate storage of such cable feed devices can usually be actively controlled via actuators (motors or compressed air cylinders) such that the distance between two rollers is changed by the actuators. This also happens when the operator threads the cable. The intermediate storage is thereby brought into its minimum position. The operator then threads a much shorter cable length than with the simple cable feed devices. The intermediate storage can be filled automatically after threading. These cable feed devices are expensive and technically complex.

SUMMARY

The invention is based on the object of demonstrating a cable feed device or a cable processing system or a method for feeding a cable to a cable processing machine which has a technically simple design or which is technically simple to carry out.

This object is achieved by a cable feed device or a cable processing system or a method for feeding a cable to a cable processing machine as described herein.

In particular, the object is achieved by a cable feed device for feeding a cable to a cable processing machine, the cable feed device comprising a first rotatable roller and a second rotatable roller for guiding the cable such that the cable can be arranged in a loop around the first roller and the second roller, wherein the cable feed device has a cable drive for transporting the cable, the first roller being arranged stationary, wherein the cable feed device is designed such that the second roller is pushed or pulled away from the first roller with a force, wherein the second roller can have a first state and a second state, wherein the second roller is locked in a first position in the first state and is moved in the second state by the force such that the distance between the first roller and the second roller changes depending on the length of the cable between the two rollers.

An advantage of this is that the cable feed device has a technically simple and inexpensive design. In addition, the cable is technically simple and quick to install or thread in the cable feed device, since the distance between the two rollers can be changed and can thus be set to a small value for threading. In the basic position or in the first state, the distance between the two rollers can be particularly small. In addition, due to its low complexity, the cable feed device is particularly robust or less prone to errors. In addition, the cable feed device can continuously remove the cable from a cable source (for example a container, a drum, or the like) in a technically simple manner and feed it step by step to the cable processing machine with interruptions. The cable feed device can also temporarily store a large amount or a large length of cable. In addition, no actuators are required that actively move the second roller.

The length of the cable between the two rollers can be determined in particular by the length of the cable which is rolled up on the two rollers and the number of loops around the two rollers. The length of the cable between the two rollers can in particular correspond to the length of the part of the cable which is looped around the two rollers but has no contact with one of the two rollers. The cable which is looped around the rollers can thus always be tensioned, since the force in the second state of the second roller always pushes or pulls the second roller away from the first roller. In the second state, the second roller can thus always be located as far away from the first roller as is possible depending on the cable looped around the rollers.

In particular, the object is also achieved by the cable processing system, a cable feed device as described above, and a cable processing machine.

The advantages of the cable processing machine substantially correspond to the advantages of the cable feed device described above.

In particular, the object is also achieved by a method for feeding a cable to a cable processing machine, wherein the cable can be arranged in a loop around a first roller and a second roller of a cable feed device for feeding the cable to the cable processing machine, in particular a cable feed device as described above, wherein the second roller can have a first state and a second state, wherein the second roller is locked at a first position in the first state and can be moved in the second state in such a way that the distance between the first roller and the second roller can be changed, wherein the second roller is pushed or pulled away from the first roller with a force, wherein the method comprises the following steps: Winding part of a cable around the two rollers, the second roller being in the second state and moving away from the first roller during winding, wherein the movement of the second roller with respect to the first roller is realized in the second state solely by winding and unwinding the cable around the two rollers and the force exerted by pushing or pulling away the second roller from the first roller.

One advantage of this is that the method can be carried out in a technically simple and quick manner. In particular, threading the cable is particularly simple since the distance between the two rollers can be particularly small. In addition, the method can be carried out with a technically simple and inexpensive cable feed device.

According to one embodiment of the cable feed device, the second roller is fastened to a deflection lever, the deflection lever being rotatably fixed to an end of the deflection lever remotely from the second roller. One advantage of this is that the second roller is technically simple to move relative to the first roller. In addition, the cable feed device has a technically particularly simple design.

According to one embodiment of the cable feed device, the second roller is pulled away from the first roller by means of a tension spring. As a result, the second roller can be pulled away permanently or in the second state with a predetermined force from the first roller in a technically simple manner. In addition, the cable feed device can thereby be designed to be particularly cost-effective. In addition, the force that pulls the second roller away from the first roller can be changed simply by changing the tension spring. In addition, the tension spring can easily be replaced if damaged.

According to one embodiment of the cable feed device, the cable drive has two wheels, at least one of the two wheels having a groove for guiding the cable. This has the advantage that damage to the cable is prevented. In particular, damage to the insulation of the cable can be reliably prevented, since the force is distributed over a large area of the roller and flattening is thus reduced. In addition, feed deviations or deviations in the position of the cable when feeding to the cable feed device from the cable source (cable roller, container, or the like) can be easily absorbed by the effective diameter of the recess or groove.

According to one embodiment of the cable feed device, the second roller can be locked and unlocked electromagnetically in the first position, wherein the deflection lever is connected to a movement-limiting element with a compensating element for contacting a position locking element of the cable feed device in such a way that the second roller in the first state is movable by a predetermined distance towards the first roller. An advantage of this is that the second roller can be locked in a position in which a portion of the cable can be unrolled from the rollers in such a way that the second roller moves towards the first roller. This makes it technically easy to check whether the cable is being transported by the cable drive. This also makes it easy to determine in how many loops the cable is looped or arranged around the two rollers without the second roller having to be unlocked.

According to one embodiment of the cable feed device, the cable feed device further comprises a position sensor for detecting the position of the second roller, in particular by means of the position of the deflection lever. One advantage of this is that the position of the second roller can be determined in a technically simple manner. This allows the distance between the first roller and the second roller to be determined in a technically simple manner. The length of the cable in the loops can thus be determined in a technically simple manner, provided the number of loops is known or has been determined.

According to one embodiment of the cable feed device, the cable feed device further comprises a monitoring device for detecting the feeding speed of the cable drive and/or the length of the cable fed by the cable drive and the position of the second roller for determining the number of loops of the two rollers. The advantage of this is that the number of loops can be determined in a technically simple manner. The feeding speed of the cable drive and/or the length of the cable fed by the cable drive can be used to determine which length of the cable is fed to the two rollers or is wound on the two rollers, and by changing the position of the second roller can be used to determine the number of loops around the two rollers based on the feed of the specific length of the cable.

According to one embodiment of the cable feed device, the cable feed device further comprises a lower stop element which defines a maximum distance between the first roller and the second roller. This makes it technically easy to ensure that the second roller cannot move further than a maximum distance from the first roller. The maximum length that can be stored by the cable feed device can thus be determined depending on the number of loops.

According to one embodiment of the method, the method further comprises the following steps: unrolling a portion of the cable from the two rollers; determining the length of the unrolled portion of the cable; detecting the change in position of the second roller during the unwinding of the portion of the cable; and determining the number of loops of the cable around the two rollers based on the length of the unrolled portion of the cable and the change in position of the second roller caused thereby. One advantage of this is that it is technically easy to determine whether the cable drive is transporting cables, i.e. is in contact with the cable. It can thus be determined that the cable drive is not in contact with the cable if there is no change in position of the second roller despite the fact that part of the cable is unrolled by means of the cable drive. In addition, by determining the change in position of the second roller relative to the first roller, i.e. the change in the distance between the two rollers to one another, and the length of the unrolled portion of the cable, it is technically easy to determine how often or in how many loops the cable runs around both rollers. The cable can in particular be moved in the direction of the cable source, i.e. backwards.

According to one embodiment of the method, the specific number of loops of the cable around the two rollers is compared with a predetermined value, a notification being output if the specific number deviates from the predetermined value. The advantage of this is that the operator can be warned and/or the operation of the cable feed device can be interrupted if a discrepancy between the number of specified loops and the actual number is determined.

According to one embodiment of the method, the cable is fed to the cable processing machine step by step with interruptions, while the cable coming from a cable source is continuously rolled up on the two rollers. The advantage of this is that the cable feed device can act as a cable storage device. In this way, the reliability of the cable processing machine, which brakes and accelerates the cable again and again, will be increased. In addition, a malfunction when removing the cable from the container is reliably prevented.

According to one embodiment of the method, the second roller is fastened to a deflection lever, the method further comprising the following steps: unrolling a portion of the cable from the two rollers until a compensating element of the deflection lever contacts a position locking element for locking the second roller; and winding a part of the cable onto the two rollers to move the second roller to the first position while the compensating element is in contact with the position locking element. An advantage of this is that the second roller comes into a position from which the second roller can approach the first roller when the cable is being unwound, despite the locking by means of the position locking element. Thus, even in the first state, in which the second roller is locked, the cable can be unwound by a predetermined length, specifically in the direction of the cable source, i.e. backwards. This unrolling can determine whether the cable drive is in contact with the cable at all and the number of loops around the two rollers can be determined while the second roller is locked or in the first state. If it is detected that the cable drive has no contact with the cable, an error message or warning message can be issued.

According to one embodiment of the method, a further cable is connected to one end of the cable wrapped around the two rollers, while the cable wrapped around the two rollers is fed to the cable processing machine. The advantage of this is that a further cable can be connected to the cable present or temporarily stored in the cable feed device, without the cable feed to the cable processing machine having to be interrupted, since the storage or buffer of the cable feed device is emptied or reduced in the meantime. In this way, when the cable provided to the cable feed device approaches the end (e.g. at the end of a roller or a container), without interruption in the operation of the cable processing machine, a similar or identical cable or another cable can be connected to one end of the cable currently fed from the cable feed device to the cable processing machine (so-called "splicing"). As a result, the length of the interruption in the operation of the cable processing machine can be minimized.

Looping around the two rollers can in particular mean that the cable runs around the first stationary roller and then around the second roller before the cable reaches the first roller again. The cable therefore typically does not make contact with the first roller or second roller over a full circle, but the cable generally runs back and forth between the first roller and the second roller, so to speak.

The invention is explained in more detail below with reference to drawings of an exemplary embodiment.

DESCRIPTION OF THE DRAWINGS

The above, as well as other advantages of the present invention, will become readily apparent to those skilled in the art from the following detailed description of a preferred embodiment when considered in the light of the accompanying drawings in which.

In the following description, the same reference numerals are used for identical and identically acting elements.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
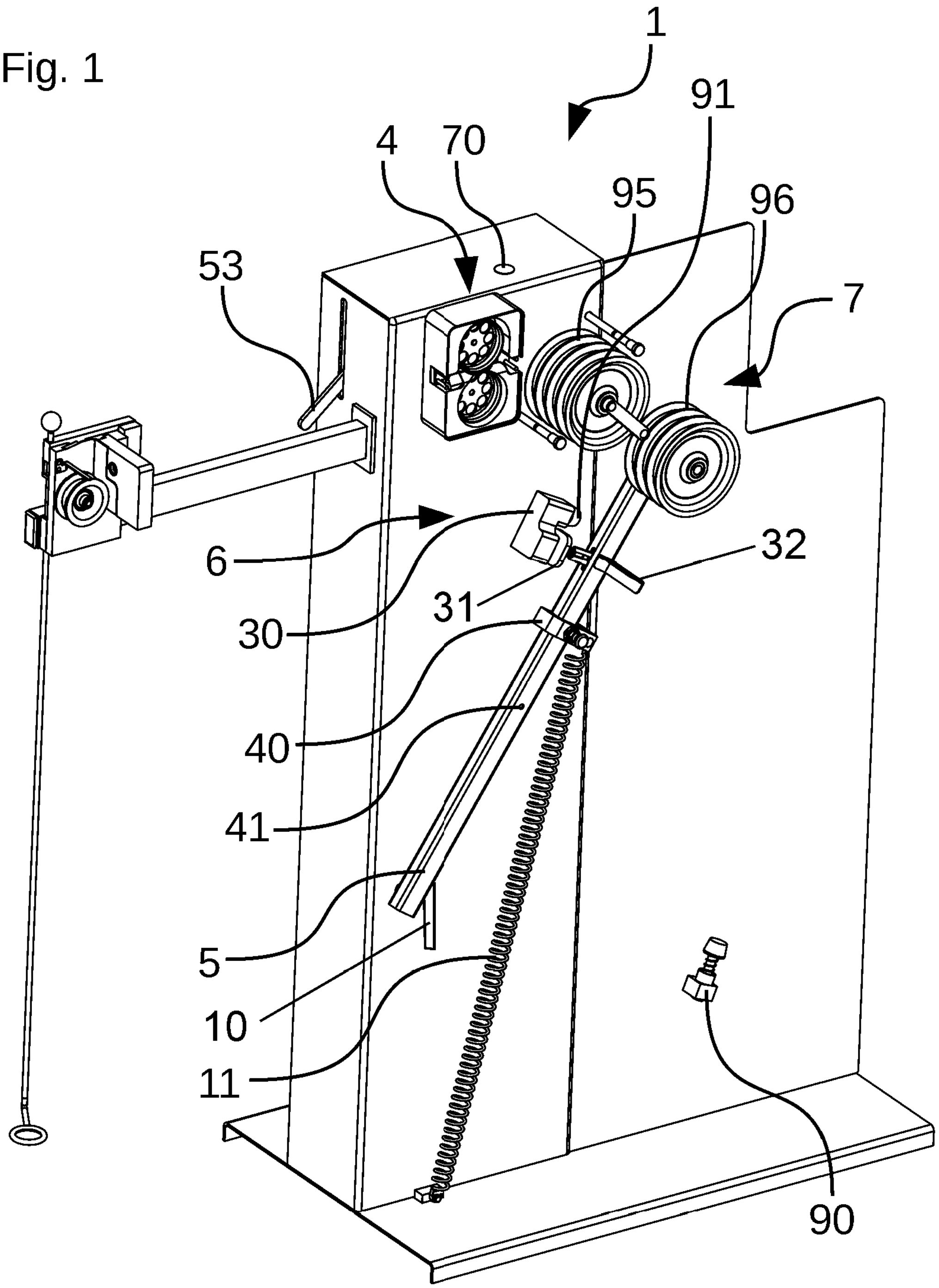
FIG. 1 is a schematic perspective view of an embodiment of the cable feed device according to the invention.

FIG. 1 shows a schematic perspective view of an embodiment of the cable feed device 1 according to the invention.

The cable feed device 1 is used to feed a cable 3 (FIG. 2) from a cable source 9 (for example a container or a drum, or the like shown in FIG. 2) to a cable processing machine 2 (FIG. 2) in which the cable 3 is processed. The cable feed device 1 serves as intermediate storage of the cable 3. The cable processing machine 2 processes the cable 3 step by step and accelerates and brakes the cable 3 again and again. In order to ensure a uniform removal of the cable 3 from the cable source 9, a part of the cable 3 is temporarily stored in the cable feed device 1 as a buffer or cable storage 7.

The cable 3 is guided from the cable source 9 to a cable drive 4 of the cable feed device 1. The cable drive 4 has two wheels, between which the cable 3 is guided and transported here. The two wheels, of which typically only one wheel is driven, can be separated from one another by means of a feed lever 53 in order to insert or feed the cable 3, and then be brought back into the position shown in FIG. 1.

The cable feed device 1 has a first roller 95 and a second roller 96. The first roller 95 is arranged stationary. The second roller 96 is movable (in the second state) in relation to the first roller 95. This means that the distance between the first roller 95 and the second roller 96 can change.

The first roller 95 and the second roller 96 each have one or more recesses for guiding the cable 3.

The cable 3 passes from the cable drive 4 to the first roller 95, partially runs around the first roller 95 and then reaches the second roller 96. In this case, the cable 3 partially runs around the second roller 96 and then returns to the first roller 95. In this case, the cable 3 runs again partially around the first roller 95. The cable 3 has now been looped. The cable 3 can then be fed to the cable processing machine 2. Alternatively, the cable 3 can first extend again to the second roller 96 in the course of a further loop, here again partially circulating the second roller 96, returning to the first roller 95, here partially circulating the first roller 95. Now (i.e. after 2 loops or revolutions), the cable 3 can be fed to the cable processing machine 2 or it can extend to the second roller 96 again in the course of a further loop, etc.

The second roller 96 is fastened to a lever or arm, or lever arm, or deflection lever 5. The second roller 96 is attached to a first end of the deflection lever 5. The other end, i.e. the end of the deflection lever 5 which is further away from the second roller 96, is rotatably fastened to the cable feed device 1.

The deflection lever 5 is acted upon by a force which pulls the deflection lever 5 downwards. As a result, the second roller 96 is permanently pulled away from the first roller 95. The force is exerted by a tension spring 11. This is attached to a point of application 40 of the deflection lever 5. The point of application 40 is located between the two ends of the deflection lever 5. In FIG. 1, the point of application 40 is somewhat closer to the second roller 96 than to the pivot point of the deflection lever 5. The position of the point of application 40 of the deflection lever 5 can be changed or locked releasably. During the operation of the cable feed device 1, the point of application 40 remains stationary with respect to the deflection lever 5. FIG. 1 shows another point of application 41 in the form of a recess or depression. The spring 11 can be attached to this further point of application 41 as an alternative to the point of application 40.

The second roller 96 has a first state and a second state. In the first state, the second roller 96 is substantially locked in a first position. The second roller 96 cannot move away from the first roller 95. In the second state, the second roller 96 can move together with the deflection lever 5 and in this way move away from the first roller 95.

The cable feed device 1 can have a position sensor 10. The position sensor 10 detects the position of the lever 5. In this way, the position of the second roller 96 can be detected. This can be carried out, for example, by means of a magnet in the deflection lever and a corresponding magnetic sensor in the cable feed device 1.

Figure 2:
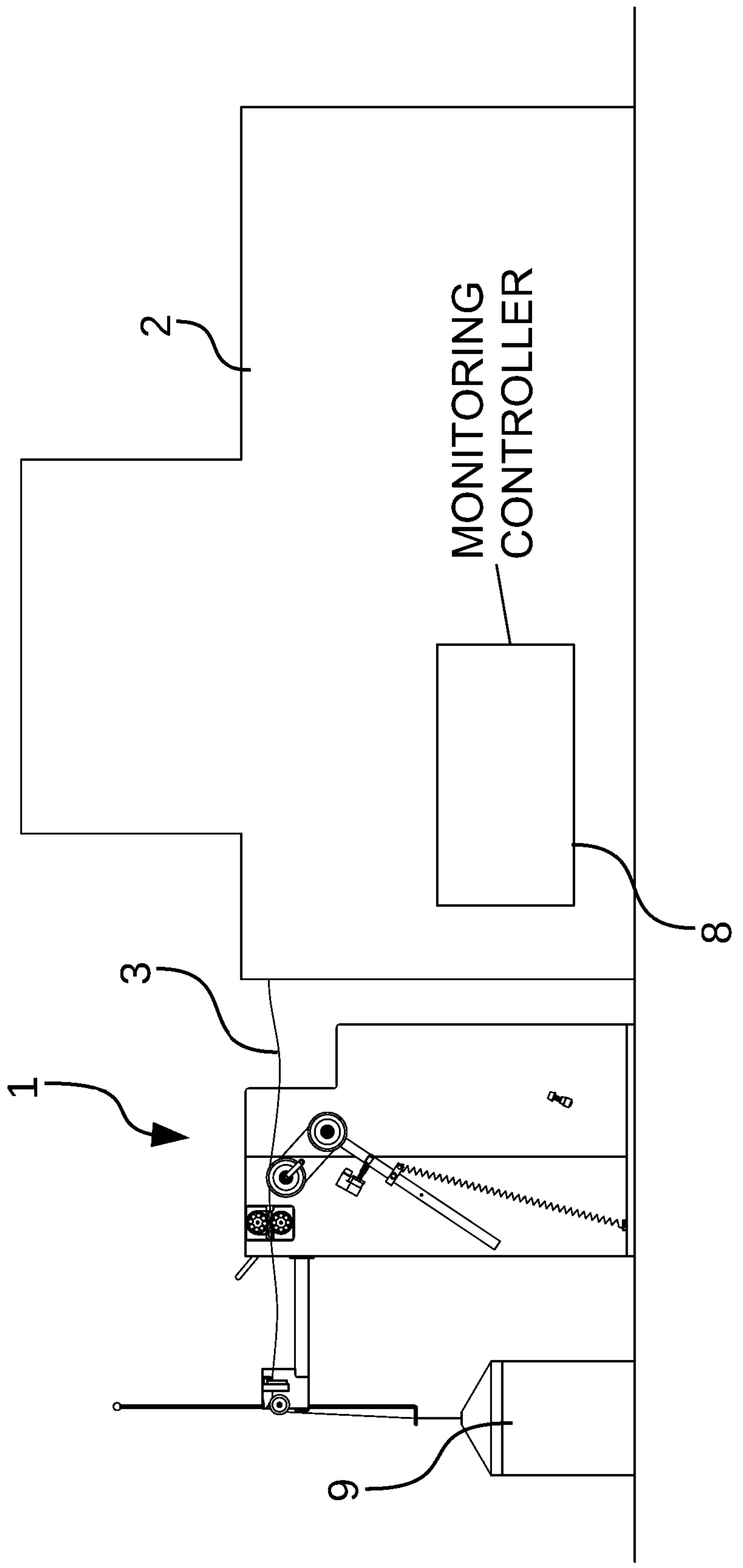
FIG. 2 is a schematic side view of the cable feed device from FIG. 1 having a cable processing machine.

FIG. 2 shows a schematic side view of the cable feed device 1 from FIG. 1 with a cable processing machine 2. FIG. 2 shows a cable system comprising the cable feed device 1 and the cable processing machine 2. The cable processing machine 2 can have a monitoring controller 8, which communicates with the cable feed device 1 in a wired or wireless manner. The monitoring controller 8 can control or regulate the cable feed device 1.

Figures 3A, 3B, 3C:
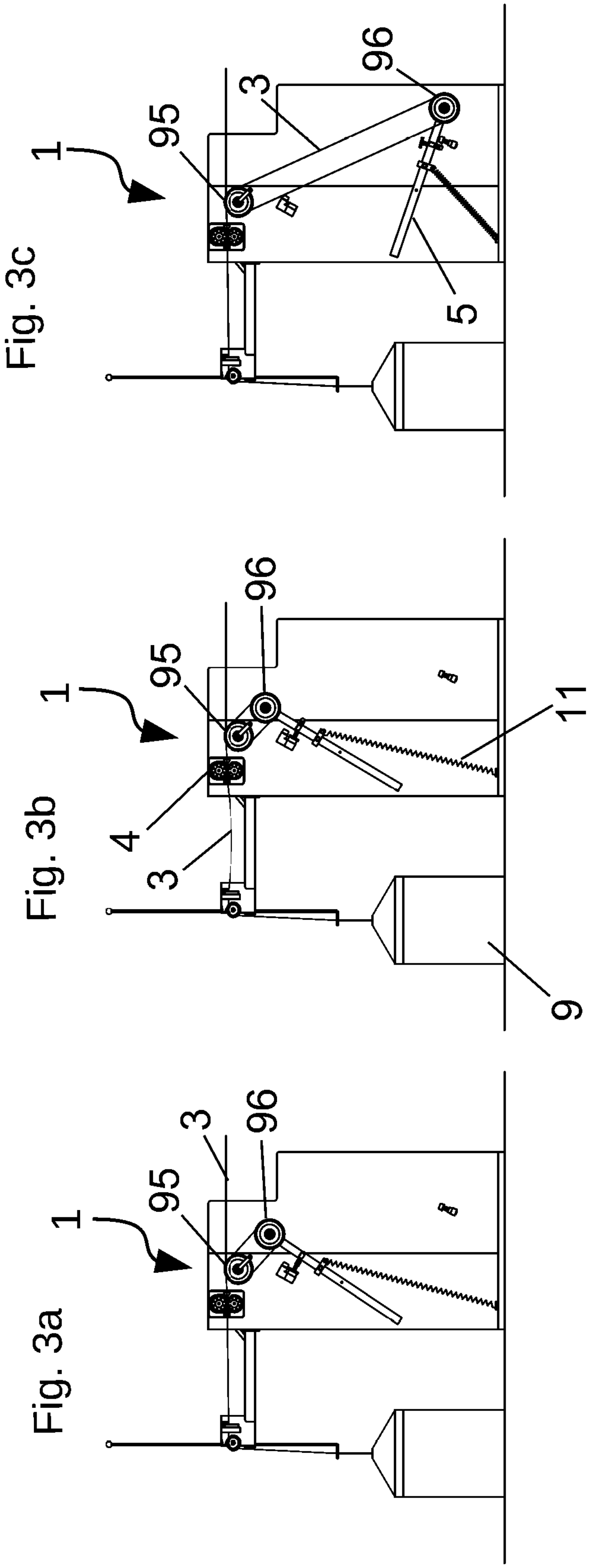
FIGS. 3*a*-3*c* are schematic side views of different positions of the second roller of the cable feed device from FIG. 1.

FIGS. 3*a*-3*c* show schematic side views of different positions of the second roller 96 of the cable feed device 1 from FIG. 1. In FIG. 3*a*, the cable 3 is looped around the two rollers 95, 96. The number of loops is not recognizable due to the side view in FIGS. 3*a*, 3*b*, and 3*c*. In FIG. 3*a*, the second roller 96 is in the first state, i.e. the second roller 96 can only be moved slightly with respect to the first roller 95. In particular, the second roller 96 cannot be moved away from the first roller 95.

Figure 4A:
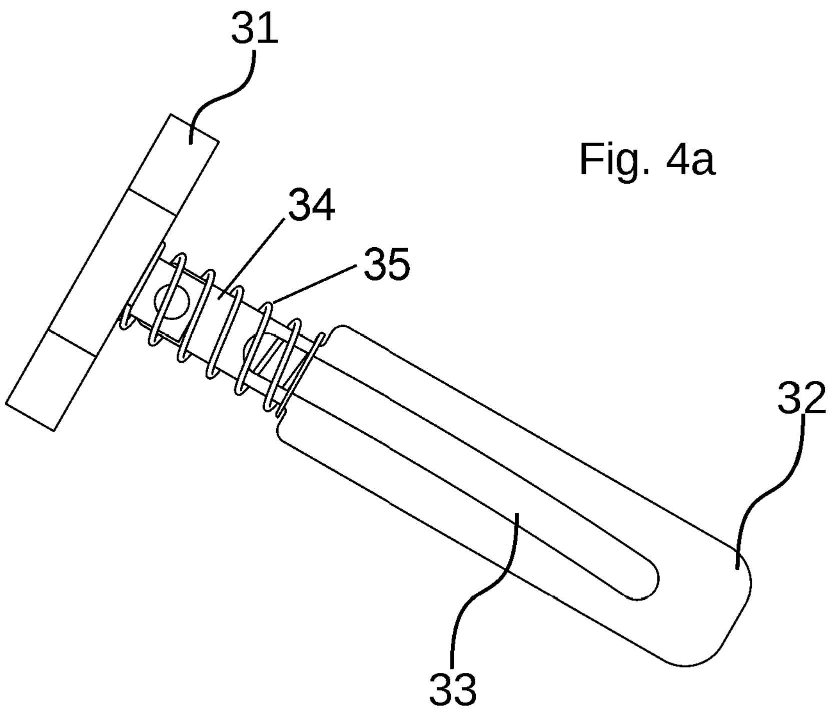
FIG. 4*a* is a detailed view of the compensating element of the movement-limiting element from FIG. 1.
Figure 4B:
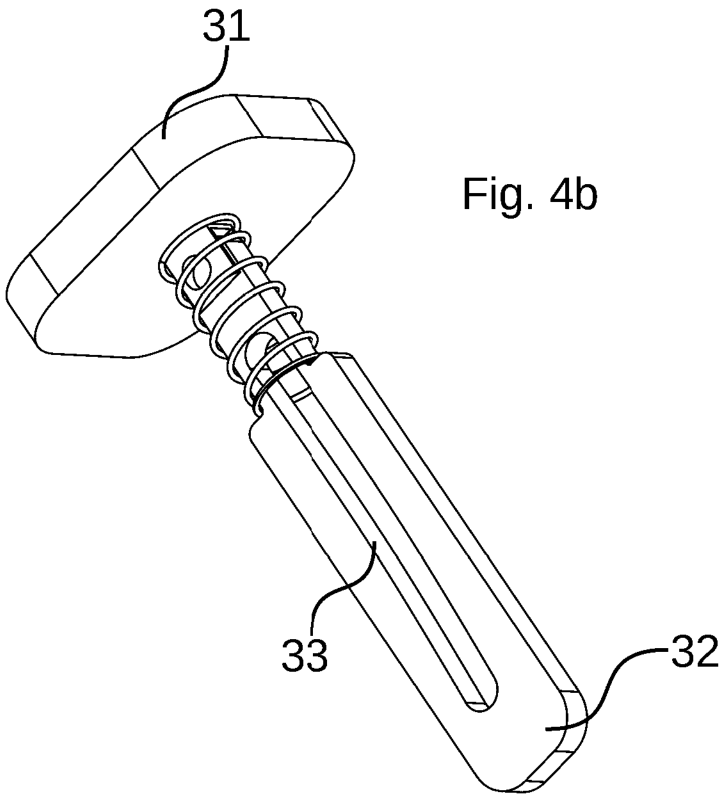
FIG. 4*b* is a further detailed view of the compensating element of the movement-limiting element from FIG. 1.

FIG. 4*a* shows a detailed view of the movement-limiting element 32 of the cable feed device 1 from FIG. 1. FIG. 4*b* shows a further detailed view of the movement-limiting element 32 of the cable feed device 1 from FIG. 1.

The deflection lever 5 is connected to a movement limitation element 32 or the movement-limiting element 32 is fastened to the deflection lever 5. The movement-limiting element 32 has an arcuate guide contour 33 or recess. The deflection lever 5 can move along its direction of movement within this arcuate guide contour 33. The movement-limiting element 32 has a compensating element 31 in the form of a compensating disk. The compensating element 31 serves to contact the position locking element 6 of the cable feed device 1. A narrower part 34 of the movement-limiting element 32 is formed between the compensating element 31 and a wider part of the movement-limiting element 32 at the end of the movement-limiting element 32 facing away from the compensating disk. The largest part of the arcuate guide contour 33 is formed in the wider part of the movement-limiting element 32. A spring 35 is present over this narrower part 34 of the movement-limiting element 32. This spring 35 has two functions. On the one hand, it presses the compensating element 31 away from the arcuate guide contour 33 or the wider part of the movement-limiting element 32. The compensating element 31 can move from the outermost position in FIG. 4*a* or FIG. 4*b* to the arcuate guide contour 33 against the force of the spring 35. On the other hand, the spring 35 ensures that the compensating element 31 is flexibly aligned with the movement-limiting element 32 around a connecting pin.

In its first task, the spring 35 ensures that when the deflection lever 5 is moved up, the compensating element 31 securely contacts the position locking element 6 and that there is sufficient travel path for a system test until a mechanical end stop or an upper stop element 91 is reached.

The second task of the spring 35 allows the compensating element 31 to align itself with the position locking element 6 without the compensating element 31 being able to tilt in an unfavorable manner.

The position locking element 6 of the cable feed device 1 has a magnet 30 which attracts the compensating element 31. As a result, the second roller 96 can be moved toward the first roller 95 until the compensating element 31 touches the position locking element 6 and an electromagnetic attraction force is thereby exerted. The main movement of the second roller 96 towards the first roller 95 occurs through the removal or pulling of the cable 3 from the cable processing machine 2. The cable drive 4 then moves backwards until the compensating element 31 touches the position locking element 6. Now, the cable drive 4 again transports some cable 3 forward, i.e. away from the cable source 9. Now, the deflection lever 5 moves within the arcuate guide contour 33 of the movement-limiting element 32 until the deflection lever 5 touches the part of the arcuate guide contour 33 facing away from the spring 35 or the compensating element 31. The second roller 96 is now in the first state. This means that the deflection lever 5 and thus also the second roller 96 is locked in or at the first position via the movement-limiting element 32 and the compensating element 31 using the position locking element 6 of the cable feed device 1. The second roller 96 is in the first state. In this state, the cable drive 4 can be switched off. The second roller 96 also remains de-energized in the first state.

The position locking element 6 can have a permanent magnet that can be "switched off". For this purpose, the position locking element 6 also has an electromagnet 30 which cancels the field of the permanent magnet. As a result, the second roller 96 remains in the first state even when the cable feed device 1 is de-energized. The second roller 96 is released by canceling the field of the permanent magnet. This means that the second roller 96 moves from the first state to the second state when the field of the permanent magnet is canceled by an opposing field, so that the compensating element 31 is no longer attracted to the permanent magnet.

However, due to the arcuate guide contour 33 of the movement-limiting element 32, the deflection lever 5 or the second roller 96 can be moved by a predetermined distance towards the first roller 95 in the first state. For this purpose, the cable drive 4 runs backwards and unwinds the cable 3 in the direction of the cable source 9 from the two rollers 95, 96. In this case, the deflection lever 5 moves towards the compensating element 31 within the limits predetermined by the movement-limiting element 32. In this way, if the length of the rewind is determined by means of the cable drive 4 and the change in position of the deflection lever 5 and thus also the change in position of the second roller 96 with respect to the first roller 95 is determined, the number of loops around the two rollers 95, 96 can be determined without releasing the locking of the second roller 96. In addition, it can be determined whether the cable drive 4 is in contact with the cable 3 at all without releasing the locking of the second roller 96. If the cable drive 4 is driven to unwind the cable 3 in the direction of the source 9 back from the two rollers 95, 96, but no movement of the second roller 96 is detected, the cable drive 4 is not in contact with the cable 3.

Consequently, even in the first state of the second roller 96, it can be determined how many loops are present around the two rollers 95, 96, i.e. without releasing the locking of the second roller 96. The specific number of loops can be compared with a predetermined number. In the event of a deviation, a warning message and/or error message can be output and/or the operation of the cable feed device 1 and/or the cable processing machine 2 can be interrupted by the monitoring controller 8.

In the first state shown in FIG. 3*a*, the operator can insert the cable 3 into the cable feed device 1 in a technically simple manner. The distance between the two rollers 95, 96 is small, so that only a little cable 3 has to be looped around the two rollers 95, 96 in order to achieve one or more loops around the two rollers 95, 96.

FIG. 3*b* shows the state after a part of the cable 3 has been unwound in the direction of the cable source 9 from the two rollers 95, 96 in order to check the number of loops around the two rollers 95, 96 and/or the contact between the cable drive 4 and the cable 3. Therefore, the cable 3 sags slightly in front of the cable drive 4. As described above, the number of loops or runs of the cable 3 around the two rollers 95, 96 can be determined.

If the cable 3 is now fed from the cable source 9 by means of the cable drive 4 to the cable feed device 1, the locking of the second roller 96 is released, so that the second roller 96 can move away from the first roller 95. Since the cable 3 is stretched between the two rollers 95, 96, this is only possible as far as is permitted by the length of the cable 3 and the number of loops around the two rollers 95, 96. The tension spring 11 always pulls the second roller 96 as far away from the first roller 95 as possible.

The length of the cable 3 between the two rollers 95, 96 determines the distance of the two rollers 95, 96 from one another in the second state of the second roller 96. In FIG. 3*c*, more cable 3 was fed to the cable feed device 1 than was removed from it (in the direction of the cable processing machine 2). As a result, the distance between the two rollers 95, 96 has increased.

The cable feed device 1 has a lower stop element 90 (FIG. 1), which limits the maximum deflection of the deflection lever 5. This also limits the maximum distance between the two rollers 95, 96 from one another. In FIG. 3*c*, the deflection lever 5 has the maximum deflection. More cable 3 can now no longer be temporarily stored in the cable feed device 1 (with the same number of loops).

The cable feed device 1 can receive cable 3 from the cable source 9 and at the same time deliver cable 3 to the cable processing machine 2. In particular, the cable 3 can be removed evenly from the cable source 9. The cable 3 can be fed to the cable processing machine 2 step by step with interruptions. Continuous feeding to the cable processing machine 2 is also possible.

Due to the function as an intermediate storage, the cable source 9 can be changed while the cable processing machine 2 is still processing cable 3 from the previous cable source 9.

At the start of production or at the start of a production lot of the cable processing machine 2, the cable feed device 1 is filled with cable 3 from the cable source 9. Here, the second roller 96 moves away from the first roller 95. Towards the end of the production or towards the end of a production lot of the cable processing machine 2, the cable feed device 1 is emptied, i.e. the second roller 96 is moved in the direction of the first roller 95. The movement of the second roller 96 to the first roller 95 takes place against the tension of the tension spring 11 solely by the removal of cable 3 by the cable processing machine 2 and the supply of cable 3 by means of the cable drive 4.

At the end of the production lot, the second roller 96 is near the position of the first state. In order to restore the initial situation, the cable 3 is conveyed backwards by the cable drive 4. The deflection lever 5, on which the second roller 96 is located, is moved up so far that the compensating element 31 securely contacts the magnet 30. Then, the deflection lever 5 is again somewhat lowered. The contacting of the compensating element 31 with the magnet 30 is checked by monitoring the movement of the deflection lever 5. If the deflection lever 5 moves beyond the target position at the end of the arcuate guide contour 33, a second locking attempt is started. If locking is successful, the cable 3 remains loosely wound around the first roller 95 and the second roller 96. This makes it technically easy to ensure that the second roller 96 is or will be locked.

The cable feed device 1 has a button 70 for reverse operation. As a result, the cable 3 can be unwound manually from the two rollers 95, 96 in the direction of the cable source 9.

The cable feed device 1 has no actuators, in particular no motors, compressed air cylinders or the like, for moving the second roller 96. The second roller 96 is moved only by feeding or removing (when moving back to the cable source 9) the cable 3 by means of the cable drive 4 or removing the cable 3 to the cable processing machine 2 and by the tension spring 11. The length of the cable 3 and the number of loops alone determine the position of the second roller 96 in the second state of the second roller 96. Of course, this depends on the preset force of the tension spring 11 and the point of application 40.

However, the force of the tension spring 11 and the point of application 40 are typically not changed during operation.

The monitoring controller 8 can detect the feed speed of the cable drive 4, the fill level of the cable feed device 1, and the current order of the cable processing machine 2.

The maximum filling quantity of the cable feed device 1 is usually between approximately 1 m and approximately 10 m. The length of the cable 3 is typically about 4.5 m at maximum filling for three loops of the rollers 95, 96 and about 1.5 m for one loop around the rollers 95, 96.

The number of loops has an influence on the cable processing. Cables with a larger cable cross section are more rigid than thinner cables. These thick cables must be guided around the rollers 95, 96 of the cable feed device 1 with higher tensile stress, otherwise they could jump out of the rollers 95, 96 under unfavorable circumstances. Cables with smaller cable cross sections, however, are sensitive. Too high tensile forces damage the cable. The tensile forces on the cable typically range from approx. 2.5 N to approx. 10 N.

In principle, the force of the deflection lever 5 can be varied by moving the point of application 40 of the tension spring 11 on the lever. If necessary, the pretensioning position of the tension spring 11 can be determined via the required motor force of the cable drive 4 when the cable 3 is pulled back (in the direction of the cable source 9). The tensile forces on the cable 3 can also be varied via the number of loops in the cable feed device 1, which can be checked with little effort. Since the cable feed device 1 or the two rollers 95, 96 behave(s) similar to a pulley, the tensile forces on the cable 3 decrease with an increasing number of loops. Thick, rigid cables having a large cable cross section are therefore preferably only threaded with one loop in the cable feed device 1. On the other hand, thin cables with small line cross sections are preferably threaded with three loops in the cable feed device 1. The necessary number of loops is known to the monitoring controller 8 (starting from the product parameters) or is specified by the operator on the cable processing machine 2.

Figure 5:
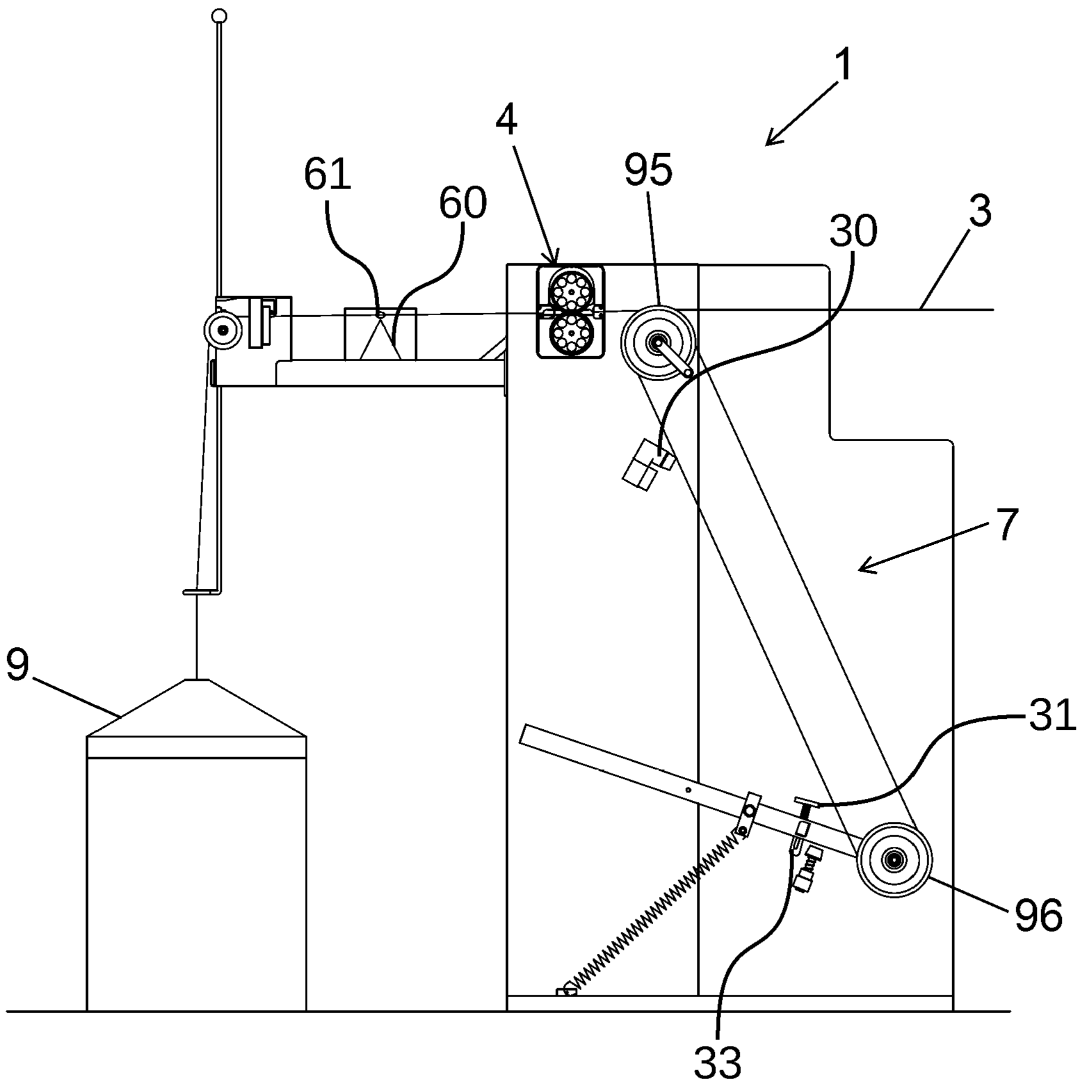
FIG. 5 is a further side view of the cable feed device from FIG. 1.

FIG. 5 shows a further side view of the cable feed device 1 from FIG. 1.

The cable feed device 1 also has advantages in special operating situations. For example, another cable can be attached to the current cable 3, which is rolled up on the two rollers 95, 96 and processed by the cable processing machine 2. The cable processing machine 2 usually receives a plurality of production orders that are processed one after the other. For example, only the color of the insulation of the cable 3 can change, and nothing else. In such cases, the cable feed device 1 having the monitoring controller 8 allows an early notification of the operator. Towards the end of the first order, the cable drive 4 stops, while the cable processing machine 2 continues to produce (with the remaining cable 3 from the cable feed device 1 or the cable storage device 7). The operator can cut the current cable 3 at the appropriate position and attach the new, subsequent cable (so-called splicing). The cable processing machine 2 can typically separate such connections independently. The time that the cable processing machine 2 comes to a standstill can be reduced in this way, particularly with short cable lengths.

A similar procedure can also be followed when the cable 3 from the container or the cable source 9 has ended. The end can be detected in a known manner such as a knot in the cable 3. The cable drive 4 stops immediately, but the cable processing machine 2 can still process the cable length present in the cable feed device 1. The operator can therefore already be informed (by a notification signal and/or a warning signal generated by the monitoring controller 8) before the production of the cable processing machine 2 comes to a standstill due to a lack of cable 3.

FIG. 5 shows the splice position mark 60 at which the cable feed device 1 stops when the cable 3 is to be changed between a first production lot and a second production lot. The user can now disconnect the cable 3 at the splice position mark 60 and link and establish a splice connection 61 from the next cable 3 to the existing cable 3, which in the meantime can be further processed by the cable processing machine 2 since the cable 3 is temporarily stored in the cable feed device 1. The cable feed device 1 can then fill up the cable storage 7 again.

Figure 6:
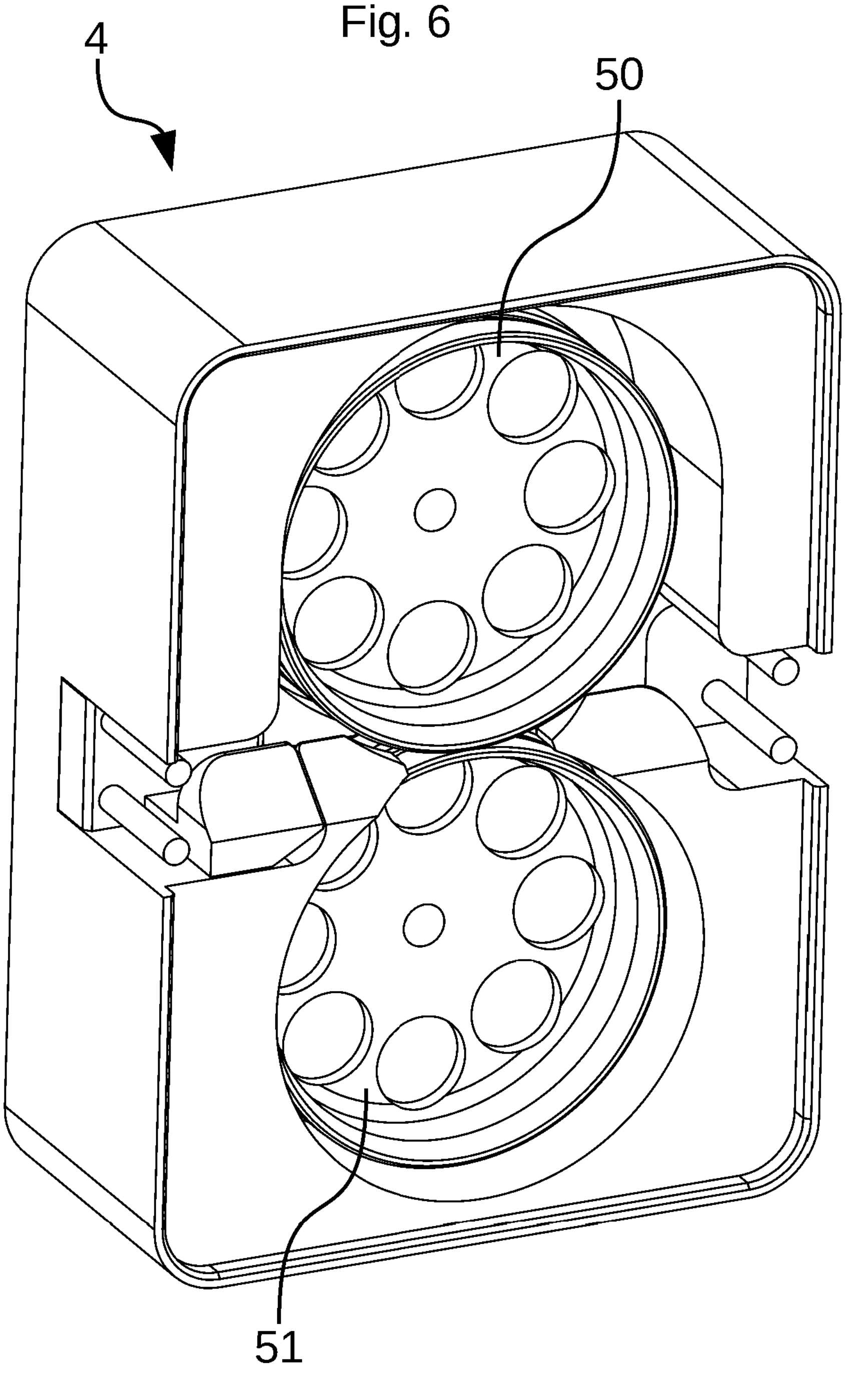
FIG. 6 is a detailed perspective view of the cable drive of the cable feed device from FIG. 1.
Figure 7A:
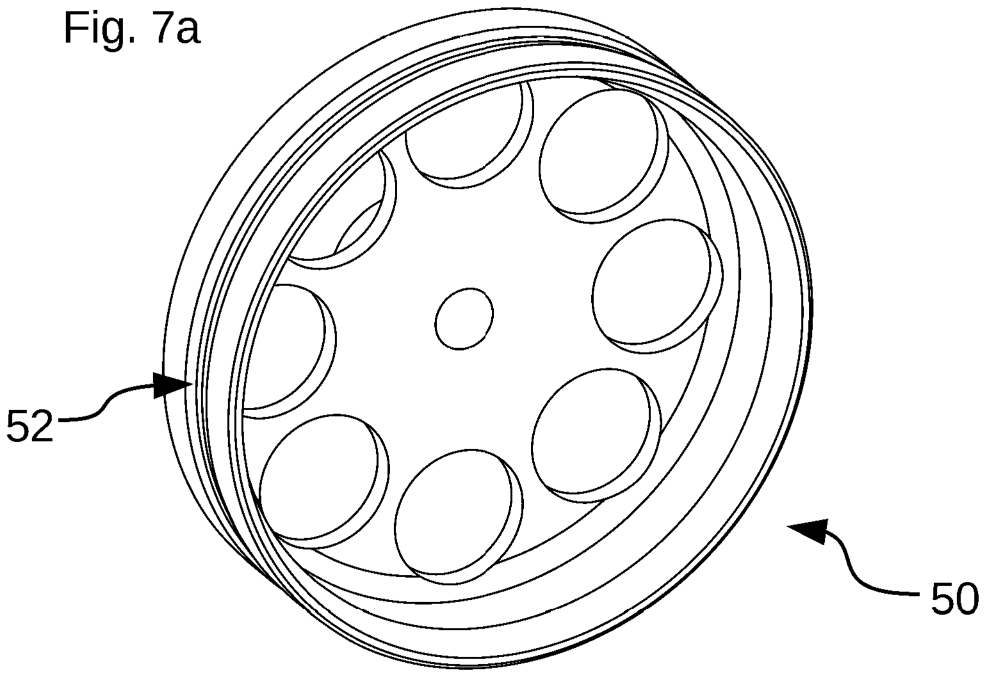
FIG. 7*a* is a perspective detail view of a wheel of the cable drive of FIG. 6.
Figure 7B:
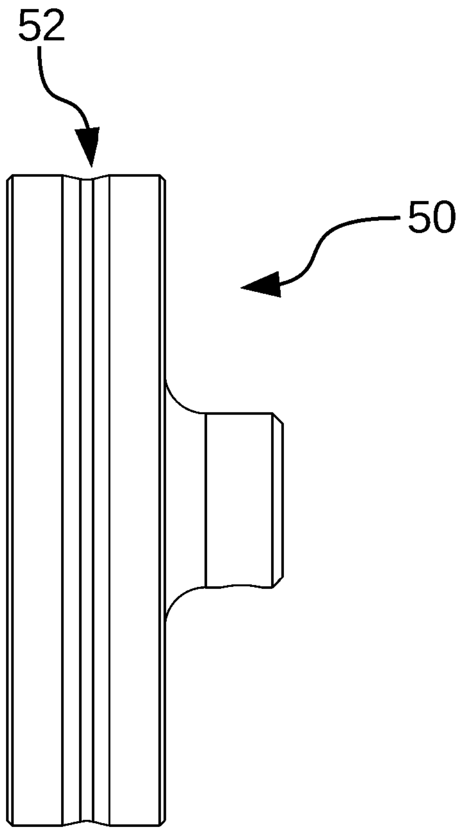
FIG. 7*b* is a plan view of a wheel of the cable drive from FIG. 6.

FIG. 6 shows a detailed view of the cable drive 4 of the cable feed device 1 from FIG. 1. FIG. 7*a* shows a perspective detailed view of a wheel of the cable drive 4 from FIG. 6. FIG. 7*b* shows a top view of a wheel of the cable drive 4 from FIG. 6.

The cable drive 4 has two cable wheels, namely a drive wheel 51 and a contact wheel 50. The contact wheel 50 is pressed in the direction of the drive wheel 51, so that the cable 3 is clamped between the two wheels. In order to improve the cable routing and to reduce damage to the cable 3, both wheels have a circumferential, concave guide groove 52. The drive wheel 51 is driven.

Conventional wheels from the prior art having a simple, cylindrical jacket can damage the insulation of a cable 3. The clamping pressure of the wheels can lead to flattening of the insulation of the cable 3 in the event of a long standstill since the force is concentrated at only two points.

The concave guide groove 52 of the embodiment according to the invention shown in FIGS. 6, 7*a*, and 7*b*, on the other hand, distributes the force over a large or larger area and thereby reduces flattening of the cable 3 or the insulation of the cable 3. The feed deviations due to the different effective diameters of the concave guide groove 52 can be easily absorbed by the cable feed device 1. The precision is typically achieved with the following cable processing machine 2 anyway. Furthermore, with the improved guidance of the cable 3 in the cable drive 4, cable damage due to fixed guide elements (e.g. ceramic eyelets) is reduced.

Figure 8:
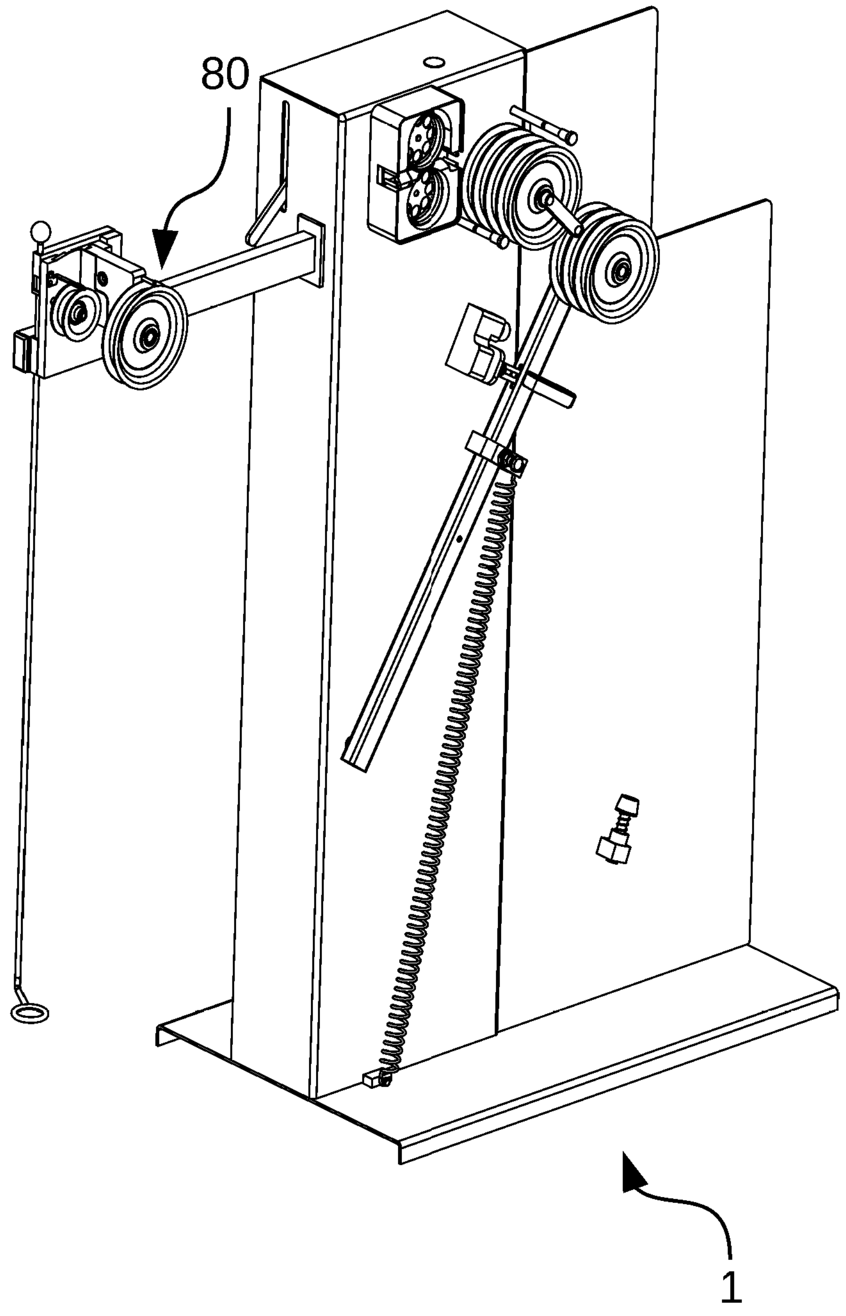
FIG. 8 is a schematic perspective view of another embodiment of the cable feed device according to the invention.

FIG. 8 shows a schematic perspective view of a further embodiment of the cable feed device according to the invention.

The embodiment of FIG. 8 differs from the embodiment of FIG. 1 in that the cable feed device 1 additionally comprises a bypass roller 80. The bypass roller 80 allows the bypass of the cable feed device 1, which is usually permanently installed in front of the cable processing machine 2 (fixed to the floor). The cable 3 can thus be fed from the cable source 9 to the cable processing machine 2 via the bypass roller 80.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 cable feed device
2 cable processing machine
3 cable
4 cable drive
5 deflection lever
6 position locking element
7 cable storage
8 monitoring controller
9 cable source
10 position sensor
11 tension spring
30 switchable magnets
31 compensating element
32 movement-limiting element
33 arcuate guide contour
34 narrower part
35 spring
40 point of application
41 further point of application
50 contact wheel
51 drive wheel
52 concave guide groove
53 feed lever of the cable drive
60 splice position mark
61 splice connection
70 button for reverse operation
80 bypass roller
90 lower stop element
91 upper stop element
95 first roller
96 second roller

What is claimed is:

1. A cable feed device for feeding a cable to a cable processing machine comprising:
- a rotatable first roller and an adjacent rotatable second roller for guiding the cable such that a part of the cable can be arranged in a loop around the first roller and the second roller;
- a cable drive for transporting the cable to the first and second rollers;
- wherein the first roller is arranged stationary;
- wherein the second roller is adapted to be pushed or pulled away from the first roller with an applied force;
- wherein the second roller has a first state and a second state;

wherein the second roller is locked in a first position in the first state and is moved by the applied force relative to the first roller in the second state such that a distance between the first roller and the second roller changes depending on a length of the cable between the first and second rollers when the cable is looped around the first and second rollers;

wherein the second roller is fixed to a deflection lever and the deflection lever is rotatably fixed on the cable feed device at an end of the deflection lever remote from the second roller; and wherein the second roller can be locked and unlocked electromagnetically in the first position, and the deflection lever is connected to a movement-limiting element with a compensating element for contacting a position locking element of the cable feed device such that the second roller is movable towards the first roller in the first state by a predetermined distance.

2. The cable feed device according to claim 1 wherein the second roller is pulled away from the first roller by a tension spring generating the applied force.

3. The cable feed device according to claim 1 wherein the cable drive has two wheels, at least one of the two wheels having a guide groove for guiding the cable.

4. The cable feed device according to claim 1 including a position sensor for detecting a position of the second roller.

5. The cable feed device according to claim 4 wherein the position sensor detects the position of the second roller by detecting a position of the deflection lever.

6. The cable feed device according to claim 1 including a monitoring controller for detecting at least one of a feeding speed of the cable drive, and a combination of a length of the cable fed by the cable drive and a position of the second roller for determining a number of loops of the cable around the first and second rollers.

7. The cable feed device according to claim 1 including a lower stop element that defines a maximum distance between the first roller and the second roller in the second state.

8. A cable processing system comprising: the cable feed device according to claim 1; and a cable processing machine for receiving the cable from the cable feed device.

9. A method for feeding a cable to a cable processing machine using the a cable feed device, the method comprising the steps of:

providing the cable feed device according to claim 1;

arranging the cable in a loop around the first roller and the second roller of the cable feed device, wherein the second roller is locked at the first position in the first state and can be pushed or pulled away from the first roller with the applied force in the second state;

winding a part of the cable around the first and second rollers to form the loop, the second roller being in the second state and moving away from the first roller during the winding; and wherein the moving away of the second roller with respect to the first roller is realized in the second state solely by winding and unwinding the cable around the two rollers and the applied force pushing or pulling the second roller away from the first roller.

10. The method according to claim 9 further comprising the steps of:

unrolling a portion of the cable from the first and second rollers;

determining a length of the unrolled portion of the cable;

detecting a change in position of the second roller while unrolling the portion of the cable; and determining a number of loops of the cable around the first and second rollers based on the length of the unrolled portion of the cable and the change in position of the second roller.

11. The method according to claim 10 including comparing the determined number of loops of the cable around the first and second rollers with a predetermined value and issuing a notification if the determined number deviates from the predetermined value.

12. The method according to claim 9 including feeding the cable in the cable processing machine step-by-step with interruptions while rolling up the cable coming from a cable source continuously on the first and second rollers.

13. The method according to claim 9 wherein the second roller is attached to the deflection lever, the method further comprising the steps of:

unrolling a portion of the cable from the first and second rollers until a compensating element of the deflection lever contacts a position locking element for locking the second roller in the first position; and winding the cable onto the first and second rollers to move the second roller into the first position while the compensating element is in contact with the position locking element.

14. The method according to claim 9 including connecting a further cable to one end of the cable while the cable looped around the first and second rollers is fed to the cable processing machine.

* * * * *